United States Patent
Peer et al.

(10) Patent No.: US 10,208,768 B2
(45) Date of Patent: Feb. 19, 2019

(54) HEAT SHIELD FOR PRESSURE CASING

(71) Applicant: Dresser-Rand Company, Olean, NY (US)

(72) Inventors: David J. Peer, Olean, NY (US); David Andrew Taylor, Issaquah, WA (US); Brian David Massey, Seattle, WA (US); Kirk Ryan Lupkes, Renton, WA (US); Scott David Wisler, Olean, NY (US); James M. Sorokes, Olean, NY (US); Mark J. Kuzdzal, Allegany, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 284 days.

(21) Appl. No.: 15/075,299

(22) Filed: Mar. 21, 2016

(65) Prior Publication Data

US 2016/0281741 A1    Sep. 29, 2016

Related U.S. Application Data

(60) Provisional application No. 62/139,054, filed on Mar. 27, 2015.

(51) Int. Cl.
*F04D 29/58* (2006.01)
*F04D 17/10* (2006.01)
(Continued)

(52) U.S. Cl.
CPC ..... *F04D 29/5853* (2013.01); *F04D 29/0516* (2013.01); *F04D 29/284* (2013.01)

(58) Field of Classification Search
CPC .... F04D 29/58–29/5893; F04D 29/662; F04D 29/08–29/108; F04D 29/0416;
(Continued)

(56) References Cited

U.S. PATENT DOCUMENTS 3,824,029 A * 7/1974 Fabri ............... F04D 29/288
                                              415/109
3,941,501 A    3/1976 Shank
                (Continued)

FOREIGN PATENT DOCUMENTS

EP    0913583 A1    5/1999
EP    1816317 A2    8/2007
(Continued)

OTHER PUBLICATIONS

Machine Translation of JP 2008014224 A.*
(Continued)

*Primary Examiner* — Kenneth Bomberg
*Assistant Examiner* — Julian Getachew

(57) ABSTRACT

A compressor may include a casing defining a discharge cavity and a seal cavity. A rotary shaft may be disposed in the casing, and a shaft seal assembly may be disposed in the seal cavity and about the rotary shaft. An impeller may be coupled with and configured to be driven by the rotary shaft. A balance piston may be integral with the impeller and may define the discharge cavity and the seal cavity. A balance piston seal may be disposed about the balance piston such that the balance piston seal and the balance piston define a radial clearance therebetween. The radial clearance may be configured to provide fluid communication from the impeller to the discharge cavity. A heat shield may be disposed in the discharge cavity, and may be configured to prevent the conduction of heat from the discharge cavity to the seal cavity via the casing.

15 Claims, 4 Drawing Sheets

(51) Int. Cl.
- *F04D 25/06* (2006.01)
- *F04D 29/06* (2006.01)
- *F04D 29/10* (2006.01)
- *F04D 29/28* (2006.01)
- *F04D 29/42* (2006.01)
- *F04D 29/44* (2006.01)
- *F04D 29/66* (2006.01)
- *F04D 29/051* (2006.01)

(58) Field of Classification Search
CPC .... F04D 29/0516; F04D 29/12; F04D 29/122; F04D 29/5853; F05D 2260/15; F05D 2260/231
See application file for complete search history.

(56) References Cited

U.S. PATENT DOCUMENTS

| | | | | |
|---|---|---|---|---|
| 2002/0037215 | A1* | 3/2002 | Choi | F04D 17/12 415/104 |
| 2008/0019829 | A1 | 1/2008 | Argaud et al. | |
| 2008/0080966 | A1 | 4/2008 | Ueno et al. | |
| 2013/0149101 | A1* | 6/2013 | Clute | F01D 3/04 415/1 |
| 2014/0030114 | A1 | 1/2014 | Gilarranz | |

FOREIGN PATENT DOCUMENTS

| | | |
|---|---|---|
| EP | 2562429 A2 | 2/2013 |
| JP | 2008014224 A * | 1/2008 |
| JP | 2013227889 A | 11/2013 |
| WO | 0166951 A2 | 9/2001 |

OTHER PUBLICATIONS

Korean Intellectual Property Office "PCT/US2016/023908 International Search Report and Written Opinion," 12 pages dated Jul. 16, 2016.

* cited by examiner

HEAT SHIELD FOR PRESSURE CASING

This application claims the benefit of U.S. Provisional Patent Application having Ser. No. 62/139,054, which was filed Mar. 27, 2015. The aforementioned patent application is hereby incorporated by reference in its entirety into the present application to the extent consistent with the present application.

STATEMENT OF GOVERNMENT INTEREST

This invention was made with government support under Government Contract No. DOE-DE-FE0000493 awarded by the U.S. Department of Energy. The government has certain rights in the invention.

BACKGROUND

Compressors and systems incorporating compressors have been developed and are often utilized in a myriad of industrial processes (e.g., petroleum refineries, offshore oil production platforms, and subsea process control systems). Conventional compressors may be configured to compress a process fluid by applying kinetic energy to the process fluid to transport the process fluid from a low pressure environment to a high pressure environment. The compressed process fluid discharged from the compressors may be utilized to efficiently perform work or operate one or more downstream processes. Improvements in the efficiency of conventional compressors has increased the application of the compressors at various oil production sites. Many of the oil production sites (e.g., offshore), however, may be constrained or limited in space. Accordingly, there is an increased interest and demand for smaller and lighter compressors, or compact compressors. In addition to the foregoing, it is often desirable that the compact compressors be capable of achieving higher compression ratios (e.g., 10:1 or greater) for increased production while maintaining a compact footprint.

As the compression ratios of the compact compressors increase, the heat generated through compression may also correspondingly increase. Improper management of the increased heat of compression may adversely affect the reliability and/or performance of the compact compressors. For example, one or more components (e.g., seals) of the compact compressors may be at least partially fabricated from a material (e.g., an elastomer) that may not be capable of operating at relatively high temperatures (e.g., greater than about 380° F./193° C.) for extended periods of time. Accordingly, the increased heat generated via compression may often limit or reduce the operational lifetimes of the components. In another example, the components (e.g., impellers) of the compact compressors may operate more efficiently when the temperatures thereof are maintained at or about respective optimum or design temperatures.

In view of the foregoing, skilled artisans have attempted to manage the heat of compression by utilizing a heat transfer medium or a cooling fluid. For example, the cooling fluid may often be circulated through one or more portions of conventional compact compressors to cool the components of the compact compressors. However, the circulation of the cooling fluid may not sufficiently manage the heat generated in compact compressors having relatively higher compression ratios (e.g., 10:1 or greater).

What is needed, then, is a heat shield for managing heat generated in a compact compressor having a relatively high compression ratio.

SUMMARY

Embodiments of the disclosure may provide a compressor. The compressor may include a casing at least partially defining a discharge cavity and a seal cavity. The compressor may also include a rotary shaft disposed in the casing, and a shaft seal assembly disposed in the seal cavity and about the rotary shaft. The compressor may further include an impeller coupled with and configured to be driven by the rotary shaft, and a balance piston integral with the impeller and at least partially defining the discharge cavity and the seal cavity. A balance piston seal may be disposed about the balance piston such that the balance piston seal and the balance piston define a radial clearance therebetween. The radial clearance may be configured to provide fluid communication from the impeller to the discharge cavity. The compressor may include a heat shield disposed in the discharge cavity. The heat shield may be configured to prevent the conduction of heat from the discharge cavity to the seal cavity via the casing.

Embodiments of the disclosure may also provide a compressor configured to provide a compression ratio of at least about 8:1. The compressor may include a casing at least partially defining a discharge cavity and a seal cavity. A rotary shaft may be disposed in the casing and configured to be driven by a driver. A shaft seal assembly may be disposed in the seal cavity and radially outward from the rotary shaft. An impeller may be coupled with the rotary shaft. The impeller may be configured to receive a process fluid and discharge the process fluid at an absolute Mach number of about one or greater. A balance piston may be integral with the impeller, and may at least partially define the discharge cavity and the seal cavity. The compressor may also include a balance piston seal disposed radially outward from the balance piston such that the balance piston seal and the balance piston define a radial clearance therebetween. The radial clearance may be configured to provide fluid communication from the impeller to the discharge cavity. A heat shield may be disposed in the discharge cavity and configured to prevent the conduction of heat from the discharge cavity to the seal cavity via the casing.

Embodiments of the disclosure may further provide a compression system comprising a driver and a compressor coupled with the driver via a drive shaft. The compressor may be configured to compress a process fluid to a compression ratio of at least about 8:1. The compressor may include a casing at least partially defining a discharge cavity and a seal cavity. A rotary shaft may be disposed in the casing and coupled with the driver via the drive shaft. The rotary shaft may be configured to be rotated by the driver via the drive shaft. A shaft seal assembly may be disposed in the seal cavity and radially outward from the rotary shaft. An impeller may be coupled with the rotary shaft and configured to discharge the process fluid at an absolute Mach number of about one or greater. A balance piston may be integral with the impeller, and may at least partially define the discharge cavity and the seal cavity. A balance piston seal may be disposed radially outward from the balance piston such that the balance piston seal and the balance piston define a radial clearance therebetween. The radial clearance may be configured to provide fluid communication from the impeller to the discharge cavity. A heat shield may be disposed in the discharge cavity and configured to prevent the conduction of heat from the discharge cavity to the seal cavity via the casing.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
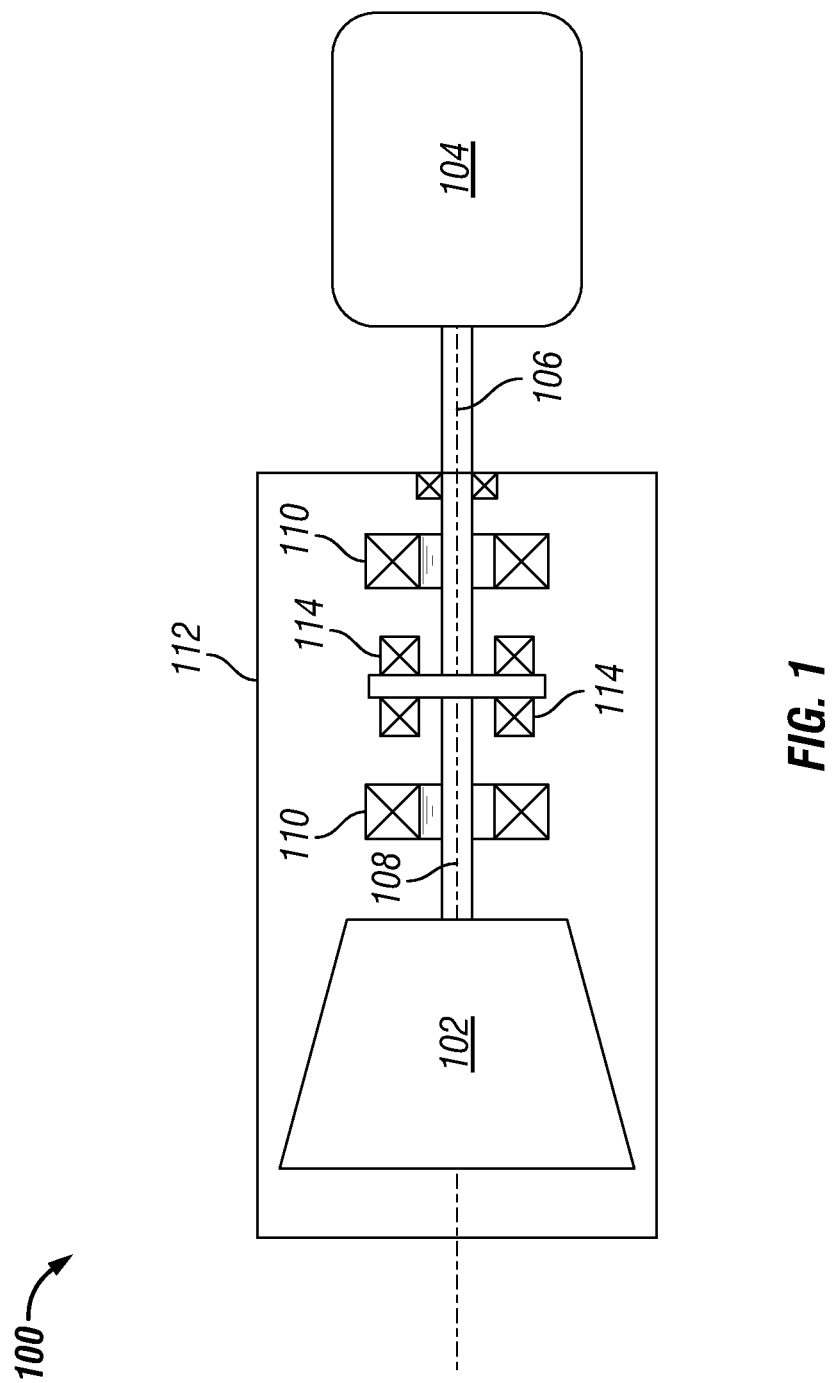
FIG. 1 illustrates a schematic view of an exemplary compression system including a compressor, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a schematic view of an exemplary compression system 100, according to one or more embodiments. The compression system 100 may include, amongst other components, one or more compressors 102 (one is shown), a driver 104, and a drive shaft 106 configured to operatively couple the compressor 102 with the driver 104. The compression system 100 may be configured to compress or pressurize a process fluid. For example, as further described herein, the driver 104 may be configured to drive the compressor 102 via the drive shaft 106 to compress the process fluid. In an exemplary embodiment, the compression system 100 may have a compression ratio of at least about 6:1 or greater. For example, the compression system 100 may compress the process fluid to a compression ratio of about 6:1, about 6.1:1, about 6.2:1, about 6.3:1, about 6.4:1, about 6.5:1, about 6.6:1, about 6.7:1, about 6.8:1, about 6.9:1, about 7:1, about 7.1:1, about 7.2:1, about 7.3:1, about 7.4:1, about 7.5:1, about 7.6:1, about 7.7:1, about 7.8:1, about 7.9:1, about 8:1, about 8.1:1, about 8.2:1, about 8.3:1, about 8.4:1, about 8.5:1, about 8.6:1, about 8.7:1, about 8.8:1, about 8.9:1, about 9:1, about 9.1:1, about 9.2:1, about 9.3:1, about 9.4:1, about 9.5:1, about 9.6:1, about 9.7:1, about 9.8:1, about 9.9:1, about 10:1, about 10.1:1, about 10.2:1, about 10.3:1, about 10.4:1, about 10.5:1, about 10.6:1, about 10.7:1, about 10.8:1, about 10.9:1, about 11:1, about 11.1:1, about 11.2:1, about 11.3:1, about 11.4:1, about 11.5:1, about 11.6:1, about 11.7:1, about 11.8:1, about 11.9:1, about 12:1, about 12.1:1, about 12.2:1, about 12.3:1, about 12.4:1, about 12.5:1, about 12.6:1, about 12.7:1, about 12.8:1, about 12.9:1, about 13:1, about 13.1:1, about 13.2:1, about 13.3:1, about 13.4:1, about 13.5:1, about 13.6:1, about 13.7:1, about 13.8:1, about 13.9:1, about 14:1, or greater.

The compressor 102 may be a direct-inlet centrifugal compressor. The direct-inlet centrifugal compressor may be, for example, a version of a Dresser-Rand Pipeline Direct Inlet (PDI) centrifugal compressor manufactured by the Dresser-Rand Company of Olean, N.Y. The compressor 102 may have a center-hung rotor configuration or an overhung rotor configuration, as illustrated in FIG. 1. In an exemplary embodiment, the compressor 102 may be an axial-inlet centrifugal compressor. In another embodiment, the compressor 102 may be a radial-inlet centrifugal compressor. As previously discussed, the compression system 100 may include one or more compressors 102. For example, the compression system 100 may include a plurality of compressors (not shown). In another example, illustrated in FIG. 1, the compression system 100 may include a single compressor 102. The compressor 102 may be a supersonic compressor or a subsonic compressor. In at least one embodiment, the compression system 100 may include a plurality of compressors (not shown), and at least one compressor of the plurality of compressors is a subsonic compressor. In another embodiment, illustrated in FIG. 1, the compression system 100 includes a single compressor 102, and the single compressor 102 is a supersonic compressor.

The compressor 102 may include one or more stages (not shown). In at least one embodiment, the compressor 102 may be a single-stage compressor. In another embodiment, the compressor 102 may be a multi-stage centrifugal compressor. Each stage (not shown) of the compressor 102 may be a subsonic compressor stage or a supersonic compressor stage. In an exemplary embodiment, the compressor 102 may include a single supersonic compressor stage. In another embodiment, the compressor 102 may include a plurality of subsonic compressor stages. In yet another embodiment, the compressor 102 may include a subsonic compressor stage and a supersonic compressor stage. Any one or more stages of the compressor 102 may have a compression ratio greater than about 1:1. For example, any one or more stages of the compressor 102 may have a compression ratio of about 1.1:1, about 1.2:1, about 1.3:1, about 1.4:1, about 1.5:1, about 1.6:1, about 1.7:1, about 1.8:1, about 1.9:1, about 2:1, about 2.1:1, about 2.2:1, about 2.3:1, about 2.4:1, about 2.5:1, about 2.6:1, about 2.7:1, about 2.8:1, about 2.9:1, about 3:1, about 3.1:1, about 3.2:1, about 3.3:1, about 3.4:1, about 3.5:1, about 3.6:1, about 3.7:1, about 3.8:1, about 3.9:1, about 4:1, about 4.1:1, about 4.2:1, about 4.3:1, about 4.4:1, about 4.5:1, about 4.6:1, about 4.7:1, about 4.8:1, about 4.9:1, about 5:1, about 5.1:1, about 5.2:1, about 5.3:1, about 5.4:1, about 5.5:1, about 5.6:1, about 5.7:1, about 5.8:1, about 5.9:1, about 6:1, about 6.1:1, about 6.2:1, about 6.3:1, about 6.4:1, about 6.5:1, about 6.6:1, about 6.7:1, about 6.8:1, about 6.9:1, about 7:1, about 7.1:1, about 7.2:1, about 7.3:1, about 7.4:1, about 7.5:1, about 7.6:1, about 7.7:1, about 7.8:1, about 7.9:1, about 8.0:1, about 8.1:1, about 8.2:1, about 8.3:1, about 8.4:1, about 8.5:1, about 8.6:1, about 8.7:1, about 8.8:1, about 8.9:1, about 9:1, about 9.1:1, about 9.2:1, about 9.3:1, about 9.4:1, about 9.5:1, about 9.6:1, about 9.7:1, about 9.8:1, about 9.9:1, about 10:1, about 10.1:1, about 10.2:1, about 10.3:1, about 10.4:1, about 10.5:1, about 10.6:1, about 10.7:1, about 10.8:1, about 10.9:1, about 11:1, about 11.1:1, about 11.2:1, about 11.3:1, about 11.4:1, about 11.5:1, 11 3.6:1, about 11.7:1, about 11.8:1, about 11.9:1, about 12:1, about 12.1:1, about 12.2:1, about 12.3:1, about 12.4:1, about 12.5:1, about 12.6:1, about 12.7:1, about 12.8:1, about 12.9:1, about 13:1, about 13.1:1, about 13.2:1, about 13.3:1, about 13.4:1, about 13.5:1, about 13.6:1, about 13.7:1, about 13.8:1, about 13.9:1, about 14:1, or greater. In an exemplary embodiment, the compressor 102 may include a plurality of compressor stages, where a first stage (not shown) of the plurality of compressor stages may have a compression ratio of about 1.75:1 and a second stage (not shown) of the plurality of compressor stages may have a compression ratio of about 6.0:1.

The driver 104 may be configured to provide the drive shaft 106 with rotational energy. The drive shaft 106 may be integral or coupled with a rotary shaft 108 of the compressor 102 such that the rotational energy of the drive shaft 106 may be transmitted to the rotary shaft 108. The drive shaft 106 of the driver 104 may be coupled with the rotary shaft 108 via a gearbox (not shown) having a plurality of gears configured to transmit the rotational energy of the drive shaft 106 to the rotary shaft 108 of the compressor 102. Accordingly, the drive shaft 106 and the rotary shaft 108 may spin at the same speed, substantially similar speeds, or differing speeds via the gearbox. The driver 104 may be a motor, such as a permanent magnetic electric motor, and may include a stator (not shown) and a rotor (not shown). It should be appreciated, however, that other embodiments may employ other types of motors including, but not limited to, synchronous motors, induction motors, and brushed DC motors, or the like. The driver 104 may also be a hydraulic motor, an internal combustion engine, a gas turbine, or any other device capable of driving or rotating the rotary shaft 108 of the compressor 102.

The compression system 100 may include one or more radial bearings 110 directly or indirectly supported by a housing 112 of the compression system 100. The radial bearings 110 may be configured to support the drive shaft 106 and/or the rotary shaft 108. The radial bearings 110 may be oil film bearings. The radial bearings 110 may also be magnetic bearings, such as active magnetic bearings, passive magnetic bearings, or the like. The compression system 100 may also include one or more axial thrust bearings 114 disposed adjacent the rotary shaft 108 and configured to control the axial movement of the rotary shaft 108. The axial thrust bearings 114 may be magnetic bearings configured to at least partially support and/or counter thrust loads or forces generated by the compressor 102.

The process fluid pressurized, circulated, contained, or otherwise utilized in the compression system 100 may be a fluid in a liquid phase, a gas phase, a supercritical state, a subcritical state, or any combination thereof. The process fluid may be a mixture, or process fluid mixture. The process fluid may include one or more high molecular weight process fluids, one or more low molecular weight process fluids, or any mixture or combination thereof. As used herein, the term "high molecular weight process fluids" refers to process fluids having a molecular weight of about 30 grams per mole (g/mol) or greater. Illustrative high molecular weight process fluids may include, but are not limited to, hydrocarbons, such as ethane, propane, butanes, pentanes, and hexanes. Illustrative high molecular weight process fluids may also include, but are not limited to, carbon dioxide ($CO_2$) or process fluid mixtures containing carbon dioxide. As used herein, the term "low molecular weight process fluids" refers to process fluids having a molecular weight less than about 30 g/mol. Illustrative low molecular weight process fluids may include, but are not limited to, air, hydrogen, methane, or any combination or mixtures thereof.

In an exemplary embodiment, the process fluid or the process fluid mixture may be or include carbon dioxide. The amount of carbon dioxide in the process fluid or the process fluid mixture may be at least about 80%, at least about 85%, at least about 90%, at least about 95%, at least about 96%, at least about 97%, at least about 98%, at least about 99%, or greater by volume. Utilizing carbon dioxide as the process fluid or as a component or part of the process fluid mixture in the compression system 100 may provide one or more advantages. For example, carbon dioxide may provide a readily available, inexpensive, non-toxic, and non-flammable process fluid. In another example, the relatively high working pressure of applications utilizing carbon dioxide may allow the compression system 100 incorporating carbon dioxide (e.g., as the process fluid or as part of the process fluid mixture) to be relatively more compact than compression systems incorporating other process fluids (e.g., process fluids not including carbon dioxide). Additionally, the high density and high heat capacity or volumetric heat capacity of carbon dioxide with respect to other process fluids may make carbon dioxide more "energy dense." Accordingly, a relative size of the compression system 100 and/or the components thereof may be reduced without reducing the performance of the compression system 100.

The carbon dioxide may be of any particular type, source, purity, or grade. For example, industrial grade carbon dioxide may be utilized as the process fluid without departing from the scope of the disclosure. Further, as previously discussed, the process fluids may be a mixture, or process fluid mixture. The process fluid mixture may be selected for one or more desirable properties of the process fluid mixture within the compression system 100. For example, the process fluid mixture may include a mixture of a liquid absorbent and carbon dioxide (or a process fluid containing carbon dioxide) that may enable the process fluid mixture to be compressed to a relatively higher pressure with less energy input than compressing carbon dioxide (or a process fluid containing carbon dioxide) alone.

Figure 2A:
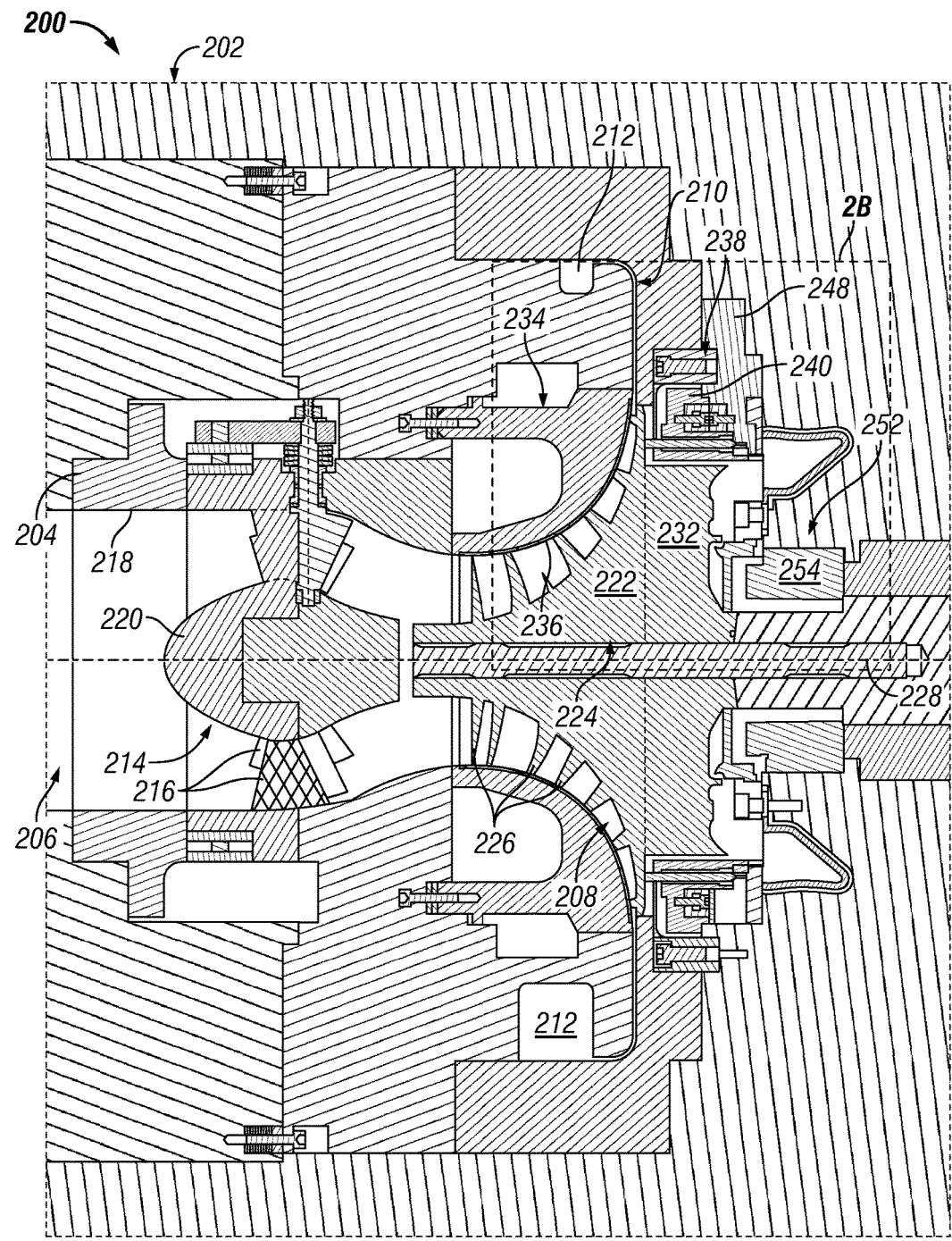
FIG. 2A illustrates a partial, cross-sectional view of an exemplary compressor that may be included in the compression system of FIG. 1, according to one or more embodiments disclosed.
Figure 2B:
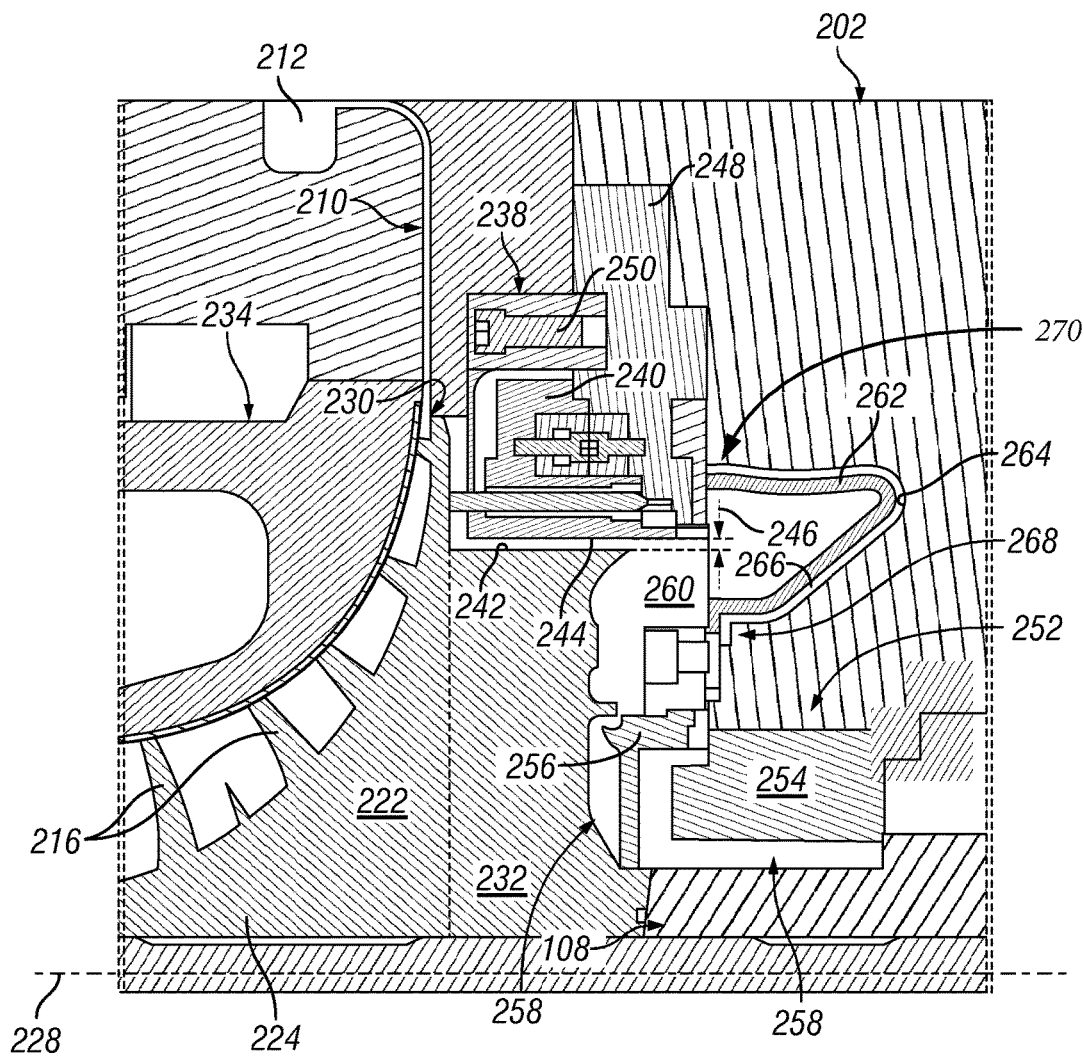
FIG. 2B illustrates an enlarged view of the portion of the compressor indicated by the box labeled 2B of FIG. 2A, according to one or more embodiments disclosed.

FIG. 2A illustrates a partial, cross-sectional view of an exemplary compressor 200 that may be included in the compression system 100 of FIG. 1, according to one or more embodiments. FIG. 2B illustrates an enlarged view of the portion of the compressor 200 indicated by the box labeled 2B of FIG. 2A, according to one or more embodiments. As illustrated in FIG. 2A, the compressor 200 may include a casing 202 and an inlet 204 (e.g., an axial inlet). The casing 202 and the inlet 204 may at least partially define a fluid pathway of the compressor 200 through which the process fluid may flow. The fluid pathway may include an inlet passageway 206 configured to receive the process fluid, an impeller cavity 208 fluidly coupled with the inlet passageway 206, a diffuser 210 (e.g., static diffuser) fluidly coupled with the impeller cavity 208, and a collector or volute 212 fluidly coupled with the diffuser 210. The casing 202 may be configured to support and/or protect one or more components of the compressor 200. The casing 202 may also be configured to contain the process fluid flowing through one or more portions or components of the compressor 200.

As illustrated in FIG. 2A, the compressor 200 may include an inlet guide vane assembly 214 configured to condition a process fluid flowing through the inlet passageway 206 to achieve predetermined or desired fluid properties and/or fluid flow attributes. Such fluid properties and/or fluid flow attributes may include flow pattern (e.g., swirl distribution), velocity, flow rate, pressure, temperature, and/or any suitable fluid property and fluid flow attribute to enable the compressor 200 to function as described herein. The inlet guide vane assembly 214 may include one or more inlet guide vanes 216 disposed in the inlet passageway 206 and configured to impart the one or more fluid properties and/or fluid flow attributes to the process fluid flowing through the inlet passageway 206. The inlet guide vanes 216 may also be configured to vary the one or more fluid properties and/or fluid flow attributes of the process fluid flowing through the inlet passageway 206. For example, respective portions of the inlet guide vanes 216 may be moveable (e.g., adjustable) to vary the one or more fluid properties and/or fluid flow attributes (e.g., swirl, velocity, mass flowrate, etc.) of the process fluid flowing through the inlet passageway 206. In an exemplary embodiment, the inlet guide vanes 216 may be configured to move or adjust within the inlet passageway 206, as disclosed in U.S. Pat. No. 8,632,302, the subject matter of which is incorporated by reference herein to the extent consistent with the present disclosure.

In another embodiment, illustrated in FIG. 2A, the inlet guide vanes 216 may extend through the inlet passageway 206 from an inner surface 218 of the inlet 204 to a hub 220 of the inlet guide vane assembly 214. The inlet guide vanes 216 may be circumferentially spaced at substantially equal intervals or at varying intervals about the hub 220. The inlet guide vanes 216 may be airfoil shaped, streamline shaped, or otherwise shaped and configured to at least partially impart the one or more fluid properties on the process fluid flowing through the inlet passageway 206.

The compressor 200 may include an impeller 222 disposed in the impeller cavity 208. The impeller 222 may have a hub 224 and a plurality of blades 226 extending from the hub 224. In an exemplary embodiment, illustrated in FIG. 2A, the impeller 222 may be an open or "unshrouded" impeller. In another embodiment, the impeller 222 may be a shrouded impeller. The impeller 222 may be configured to rotate about a longitudinal axis 228 of the compressor 200 to increase the static pressure and/or the velocity of the process fluid flowing therethrough. For example, the hub 224 of the impeller 222 may be coupled with the rotary shaft 108, and the impeller 222 may be driven or rotated by the driver 104 (see FIG. 1) via the rotary shaft 108 and the drive shaft 106. The rotation of the impeller 222 may draw the process fluid into the compressor 200 via the inlet passageway 206. The rotation of the impeller 222 may further draw the process fluid to and through the impeller 222 and accelerate the process fluid to a tip 230 (see FIG. 2B) of the impeller 222, thereby increasing the static pressure and/or the velocity of the process fluid. The plurality of blades 226 may be configured to impart the static pressure (potential energy) and/or the velocity (kinetic energy) to the process fluid to raise the velocity of the process fluid and direct the process fluid from the impeller 222 to the diffuser 210 fluidly coupled therewith. The diffuser 210 may be configured to convert kinetic energy of the process fluid from the impeller 222 into increased static pressure.

In one or more embodiments, the process fluid at the tip 230 of the impeller 222 may be subsonic and have an absolute Mach number less than one. For example, the process fluid at the tip 230 of the impeller 222 may have an absolute Mach number less than 1, less than 0.9, less than 0.8, less than 0.7, less than 0.6, less than 0.5, less than 0.4, less than 0.3, less than 0.2, or less than 0.1. Accordingly, in such embodiments, the compressors 102, 200 discussed herein may be "subsonic," as the impeller 222 may be configured to rotate about the longitudinal axis 228 at a speed sufficient to provide the process fluid at the tip 230 thereof with an absolute Mach number of less than one.

In one or more embodiments, the process fluid at the tip 230 of the impeller 222 may be supersonic and have an absolute Mach number of one or greater. For example, the process fluid at the tip 230 of the impeller 222 may have an absolute Mach number of at least 1, at least 1.1, at least 1.2, at least 1.3, at least 1.4, or at least 1.5. Accordingly, in such embodiments, the compressors 102, 200 discussed herein are said to be "supersonic," as the impeller 222 may be configured to rotate about the longitudinal axis 228 at a speed sufficient to provide the process fluid at the tip 230 thereof with an absolute Mach number of one or greater or with a fluid velocity greater than the speed of sound. In a supersonic compressor or a stage thereof, the rotational or tip speed of the impeller 222 may be about 500 meters per second (m/s) or greater. For example, the tip speed of the impeller 222 may be about 510 m/s, about 520 m/s, about 530 m/s, about 540 m/s, about 550 m/s, about 560 m/s, or greater.

As illustrated in FIGS. 2A and 2B, the compressor 200 may include a balance piston 232 configured to balance an axial thrust generated by the impeller 222 during one or more modes of operating the compressor 200. In at least one embodiment, the balance piston 232 and the impeller 222 may be separate components. For example, the balance piston 232 and the impeller 222 may be separate annular components coupled with one another. In another embodiment, illustrated in FIGS. 2A and 2B, the balance piston 232 may be integral with the impeller 222, such that the balance piston 232 and the impeller 222 may be formed from a single or unitary annular piece.

As illustrated in FIGS. 2A and 2B, the compressor 200 may also include a shroud 234 disposed proximal the impeller 222. For example, the shroud 234 may be disposed adjacent the plurality of blades 226 of the impeller 222. The shroud 234 may extend annularly about the impeller 222 such that an inner surface 236 thereof may be disposed near or proximal the plurality of blades 226 of the impeller 222. During one or more modes of operating the compressor 200, the inner surface 236 of the shroud 234 and the impeller 222 may define an impeller clearance (not shown) therebetween.

As illustrated in FIGS. 2A and 2B, the compressor 200 may include a balance piston seal assembly 238 having a balance piston seal 240 disposed about the balance piston 232 and configured to prevent or reduce a flow of the process fluid from leaking or flowing past the balance piston 232. For example, as illustrated in FIG. 2B, the balance piston seal 240 may be disposed radially outward from an outer radial surface 242 of the balance piston 232. In at least one embodiment, illustrated in FIG. 2A, the balance piston seal 240 may be or include a single, annular monolithic body. In another embodiment, the balance piston seal 240 may be formed from one or more arcuate segments configured to be coupled with one another. The balance piston seal 240 may be fabricated from one or more metals (e.g., a metal alloy). The balance piston seal 240 may be rotationally stationary with respect to the rotary shaft 108 and the balance piston 232 coupled therewith, which may rotate relative to the balance piston seal 240. An inner radial surface 244 of the balance piston seal 240 may extend circumferentially about and be radially offset from the outer radial surface 242 of the balance piston 232. The inner radial surface 244 of the balance piston seal 240 and the outer radial surface 242 of the balance piston 232 may at least partially define a radial gap or clearance 246 therebetween.

The inner radial surface 244 of the balance piston seal 240 may be or may provide a seal surface for the balance piston seal 240. It should be appreciated that the inner radial surface 244 may define any type of seal known in the art. For example, the inner radial surface 244 of the balance piston seal 240 may define a plurality of teeth (not shown) extending radially inward toward the outer radial surface 242 of the balance piston 232. Accordingly, the balance piston seal 240 may have a labyrinth seal along the inner radial surface 244 thereof. In another example, the inner radial surface 244 of the balance piston seal 240 may define a plurality of holes or openings (not shown). Accordingly, the balance piston seal 240 may provide a hole pattern sealing surface or a damper-type seal surface along the inner radial surface 244 thereof. In yet another example, the inner radial surface 244 may define a plurality of generally hexagonally-shaped openings (not shown) to thereby provide the balance piston seal 240 with a honeycomb seal surface along the inner radial surface 244 thereof.

The balance piston seal 240 may be coupled with (e.g., indirectly or directly) the casing 202. In at least one embodiment, the balance piston seal 240 may be directly coupled with the casing 202. In another embodiment, the balance piston seal 240 may be indirectly coupled with the casing 202 via a stationary support 248 of the balance piston seal assembly 238. The balance piston seal 240 may generally be stationary with respect to the rotary shaft 108 and the balance piston 232 coupled therewith, which may rotate relative to the balance piston seal 240. In at least one example, the balance piston seal 240 may be coupled with the stationary support 248 and/or the casing 202 via one or more mechanical fasteners (one is shown 250). Illustrative mechanical fasteners may include, but are not limited to, one or more bolts, studs and nuts, or any other mechanical fasteners known in the art. In another example, the balance piston seal 240 may be coupled with the stationary support 248 via an interference or resistance fit or interlocking connections. In at least one embodiment, the stationary support 248 may be coupled with the casing 202. In another embodiment, the stationary support 248 may form a portion of or be integral with the casing 202 of the compressor 200.

The compressor 200 may include a shaft seal assembly 252 disposed proximal the balance piston 232 and about the rotary shaft 108. The shaft seal assembly 252 may include one or more seals (two are indicated 254, 256) disposed radially outward from and coaxially aligned with the rotary shaft 108. As illustrated in FIG. 2B, the casing 202 and/or the balance piston 232 may at least partially define a seal cavity 258 configured to receive the one or more seals 254, 256. The seals 254, 256 may generally be configured to prevent the compressed process fluid from flowing or leaking out of the casing 202. The one or more seals 254, 256 may be or include dry gas seals, labyrinth seals, or the like, or any combination thereof. For example, as illustrated in FIG. 2B, a first seal, illustrated as a dry gas seal 254, may be disposed in the seal cavity 258. The dry gas seal 254 may be configured to receive a seal gas or a conditioned gas to prevent the compressed process fluid from leaking out of the casing 202. For example, the seal gas may be directed to the seal cavity 258 and the dry gas seal 254 contained therein to form a non-contacting seal between the dry gas seal 254 and the rotary shaft 108. In at least one embodiment, the seal gas may be a portion of the compressed process fluid from a discharge line (not shown) of the compressor 200. In another embodiment, the seal gas may be provided by a closed-loop or an open-loop system. For example, the seal gas may be provided by an internal closed-loop system including a cooler and configured to circulate and cool the seal gas. In another example, the seal gas may be provided by an open-loop system configured to receive and circulate the seal gas. As further illustrated in FIG. 2B, a second seal 256 may be or include a labyrinth seal. The labyrinth seal 256 may be disposed in the seal cavity 258 between the balance piston 232 and the dry gas seal 254. The labyrinth seal 256 may generally be configured to prevent the compressed process fluid discharged from the tip 230 of the impeller 126 from flowing into or entering the seal cavity 258.

The casing 202, the shaft seal assembly 252, and/or the balance piston 232 may at least partially define a discharge cavity 260 configured to receive the process fluid flowing through the radial clearance 246. As illustrated in FIG. 2B, the discharge cavity 260 may be disposed near or proximal the balance piston 232 and the labyrinth seal 256. As further illustrated in FIG. 2B, the discharge cavity 260 may be disposed radially outward of the seal cavity 258. The discharge cavity 260 may extend annularly about the seal cavity 258 and the labyrinth seal 256. As further described herein, the discharge cavity 260 may be configured to receive at least a portion of the compressed process fluid discharged from the impeller 222 and leaked through the radial clearance 246. The discharge cavity 260 may have any shape and/or size suitable for receiving at least a portion of the compressed process fluid from the radial clearance 246.

Figure 2C:
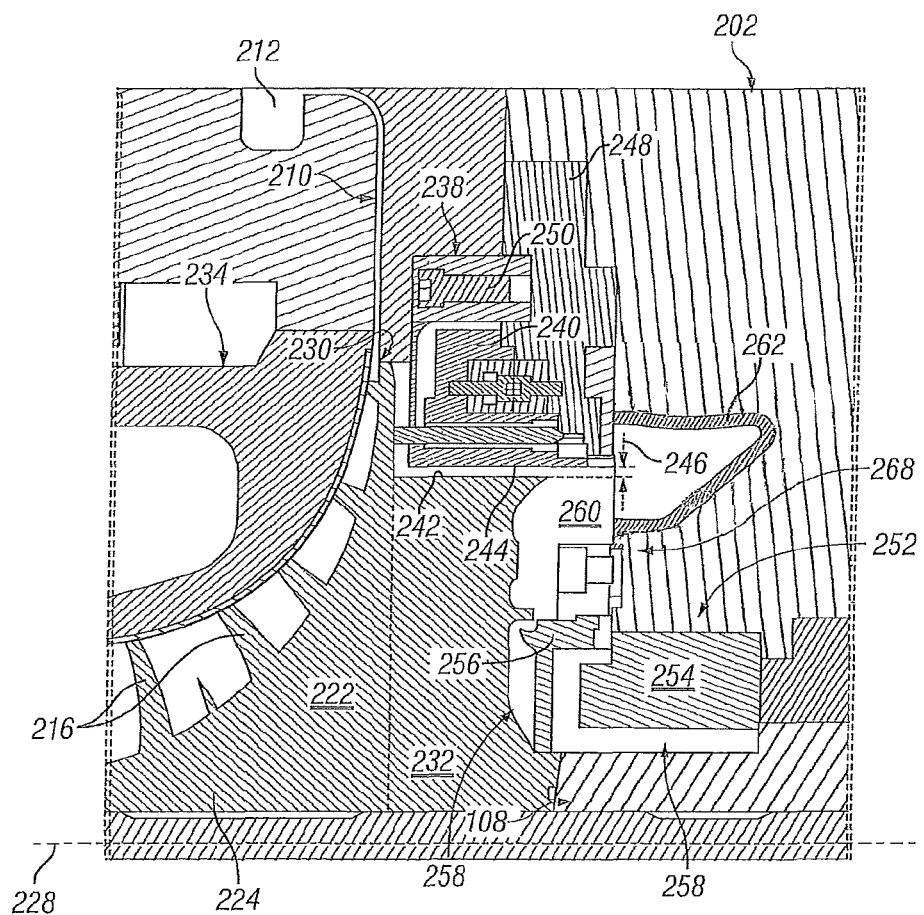
FIG. 2C illustrates an enlarged view of the portion of the compressor indicated by the box labeled 2B of FIG. 2A, according to one or more embodiments disclosed.

A thermal barrier or heat shield 262 may be disposed in the discharge cavity 260 and configured to prevent contact (e.g., direct contact) between the compressed process fluid from the radial clearance 246 and the portion of the casing 202 defining the discharge cavity 260. For example, as illustrated in FIG. 2B, the heat shield 262 may be disposed proximal an inner surface 264 of the casing 202 defining at least a portion of the discharge cavity 260. The heat shield 262 may extend annularly about at least a portion of the discharge cavity 260. In at least one embodiment, the heat shield 262 may be disposed adjacent the inner surface 264 such that the heat shield 262 may directly contact the inner surface 264 of the casing 202, as shown in FIG. 2C. For example, the heat shield 262 may form a liner along the inner surface 264 of the casing 202. In another embodiment, at least a portion of the heat shield 262 may be spaced from the inner surface 264 of the casing 202. For example, as illustrated in FIG. 2B, the heat shield 262 may be disposed proximal the inner surface 264 of the casing 202 such that the heat shield 262 and the inner surface 264 at least partially define an insulating gap or a cooling gap 266 therebetween.

The cooling gap 266 may be configured to at least partially regulate or maintain the temperature of the seal cavity 258 and the seals 254, 256 disposed therein. For example, as further described herein, the cooling gap 266 may insulate or reduce the transfer of heat (e.g., via conduction) from the heat shield 262 to the portion of the casing 202 defining the seal cavity 258. In another example, the cooling gap 266 may be configured to receive a cooling fluid to at least partially regulate the temperature of the seal cavity 258 and the seals 254, 256 disposed therein. For example, a first end portion 268 of the cooling gap 266 may be configured to receive a cooling fluid and direct the cooling fluid through the cooling gap 266. The first end portion 268 of the cooling gap 266 may be in fluid communication with a cooling fluid source and configured to receive the cooling fluid therefrom. In at least one embodiment, the cooling fluid source may be the seal cavity 258 and the cooling fluid may be the seal gas discharged from the seal cavity 258. In another embodiment, the cooling fluid source may be a cooling system. For example, the cooling fluid source may be an internal cooling system or an external cooling system configured to deliver the cooling fluid to the cooling gap 266. In another example, the cooling fluid source may be a closed-loop or an open-loop cooling system. The cooling fluid may be discharged from the cooling gap 266 via a second end portion 270 thereof.

The heat shield 262 may be fabricated from a material configured to reduce the transfer or transmission of heat from the heat shield 262 to the casing 202 (e.g., via conduction). For example, the heat shield 262 may be fabricated from a material having a relatively low thermal conductivity. As used herein, the term "low thermal conductivity material" refers to a material having a thermal conductivity relatively lower than iron. Illustrative materials may include, but are not limited to, carbon steel, bronze, titanium, ceramics, or any alloys or compounds thereof. The heat shield 262 may also be fabricated from a material having a relatively high thermal conductivity to increase cooling of the heat shield 262 from the cooling fluid flowing through the cooling gap 266. Illustrative materials having a relatively high thermal conductivity may include, but are not limited to, one or more metals, such as aluminum, iron, or the like, or any alloys or compounds thereof. The heat shield 262 may also be fabricated from one or more ceramics, such as a metal oxide.

In an exemplary operation of the compressor 200, with continued reference to FIGS. 2A and 2B, the driver 104 (see FIG. 1) may drive the compressor 200 from rest to the steady state mode of operation by accelerating or rotating the rotary shaft 108 (via the drive shaft 106), the impeller 222, and the balance piston 232 coupled therewith. The impeller 222 and the balance piston 232 may rotate relative to the balance piston seal 240 and about the longitudinal axis 228. The acceleration and/or rotation of the impeller 222 may draw the process fluid into the compressor 200 via the inlet passageway 206. The inlet guide vanes 216 disposed in the inlet passageway 206 may induce one or more flow properties (e.g., swirl) to the process fluid flowing therethrough. The rotation of the impeller 222 may further draw the process fluid from the inlet passageway 206 to and through the rotating impeller 222, and urge the process fluid to the tip 230 of the impeller 222, thereby increasing the velocity (e.g., kinetic energy) thereof. The process fluid from the impeller 222 may be discharged from the tip 230 thereof and directed to the diffuser 210 fluidly coupled therewith. The diffuser 210 may receive the process fluid from the impeller 222 and convert the velocity (e.g., kinetic energy) of the process fluid from the impeller 222 to potential energy (e.g., increased static pressure). The diffuser 210 may direct the process fluid downstream to the volute 212 fluidly coupled therewith. The volute 212 may collect the process fluid and deliver the process fluid to one or more downstream pipes and/or process components (not shown). The volute 212 may also be configured to increase the static pressure of the process fluid flowing therethrough by converting the kinetic energy of the process fluid to increased static pressure.

During one or more modes of operation, at least a portion of the process fluid discharged from the impeller 222 may flow or leak from the impeller 222 to the discharge cavity 260 via the radial clearance 246. In conventional compressors, the flow of the process fluid through the radial clearance 246 may result in the excessive heating of the shaft seal assembly 252, thereby reducing the operational lifetime of the shaft seal assembly 252 and/or components thereof. For example, compressing the process fluid in the compressor 200 may generate thermal energy (e.g., heat of compression) to thereby heat the process fluid discharged from the impeller 222. In a conventional compressor, a portion of the heated process fluid discharged from the impeller 222 may flow through the radial clearance 246 and impinge or contact the casing 202 near or proximal the shaft seal assembly 252, and the casing 202 may absorb at least a portion of the heat from the heated process fluid and transfer the heat to the shaft seal assembly 252 via conduction. In the exemplary compressor 200 discussed and described herein, the portion of the heated process fluid discharged from the impeller 222 and flowing to the discharge cavity 260 via the radial clearance 246 may not impinge or contact the casing 202. For example, as illustrated in FIG. 2B, the heat shield 262 may insulate the portion of the casing 202 near or proximal the shaft seal assembly 252 from the portion of the heated process fluid contained in the discharge cavity 260. Accordingly, the heat shield 262 may prevent the conduction of heat from the discharge cavity 260 to the shaft seal assembly 252 via the casing 202.

As previously discussed, a cooling fluid may be directed through the cooling gap 266 to at least partially cool the heat shield 262. The cooling fluid may also be directed through the cooling gap 266 to at least partially thermally insulate the shaft seal assembly 252 from the discharge cavity 260. In an exemplary embodiment, the cooling fluid may be the seal gas injected into and discharged from the seal cavity 258. In another embodiment, the cooling fluid may be from a cooling system. The cooling fluid may be directed through the cooling gap 266 from the first end portion 268 to the second end portion 270 thereof. The cooling fluid discharged from the cooling gap 266 may be combined with the compressed process fluid contained in the discharge cavity 260, and subsequently discharged from the compressor 200. It should be appreciated that the cooling fluid discharged from the cooling gap 266 may cool at least a portion of the process fluid contained in the discharge cavity 260.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A compressor, comprising:
a casing at least partially defining a discharge cavity and a seal cavity;
a rotary shaft disposed in the casing; a shaft seal assembly disposed in the seal cavity and about the rotary shaft;
an impeller coupled with and configured to be driven by the rotary shaft; a balance piston integral with the impeller and at least partially defining the discharge cavity and the seal cavity;
a balance piston seal disposed about the balance piston such that the balance piston seal and the balance piston define a radial clearance therebetween, the radial clearance being configured to provide fluid communication from the impeller to the discharge cavity; and
a heat shield disposed in the discharge cavity and configured to prevent conduction of heat from the discharge cavity to the seal cavity via the casing, wherein the heat shield is disposed adjacent an inner surface of the casing such that the heat shield directly contacts the inner surface of the casing.

2. A compressor, comprising:
a casing at least partially defining a discharge cavity and a seal cavity;
a rotary shaft disposed in the casing; a shaft seal assembly disposed in the seal cavity and about the rotary shaft;
an impeller coupled with and configured to be driven by the rotary shaft; a balance piston integral with the impeller and at least partially defining the discharge cavity and the seal cavity;
a balance piston seal disposed about the balance piston such that the balance piston seal and the balance piston define a radial clearance therebetween, the radial clearance being configured to provide fluid communication from the impeller to the discharge cavity; and
a heat shield disposed in the discharge cavity and configured to prevent conduction of heat from the discharge cavity to the seal cavity via the casing,
wherein the heat shield is disposed proximal an inner surface of the casing such that the heat shield and the inner surface define a cooling gap therebetween,
wherein a first end portion of the cooling gap is in fluid communication with a cooling fluid source and configured to receive a cooling fluid therefrom, wherein the cooling fluid source comprises an internal cooling fluid source or an external cooling source.

3. The compressor of claim 2, wherein a second end portion of the cooling gap is in fluid communication with the discharge cavity and configured to discharge the cooling fluid to the discharge cavity.

4. The compressor of claim 2, wherein the cooling fluid source is the seal cavity, and the cooling fluid is seal gas discharged from the seal cavity.

5. The compressor of claim 2, wherein the cooling fluid source is a closed-loop cooling system of the compressor.

6. The compressor of claim 2, wherein the heat shield is fabricated from a material having a thermal conductivity lower than iron.

7. A compressor, comprising:
a casing at least partially defining a discharge cavity and a seal cavity;
a rotary shaft disposed in the casing and configured to be driven by a driver; a shaft seal assembly disposed in the seal cavity and radially outward from the rotary shaft;
an impeller coupled with the rotary shaft, the impeller configured to receive a process fluid and discharge the process fluid at an absolute Mach number in a range from 1 Mach to 1.5 Mach;
a balance piston integral with the impeller and at least partially defining the discharge cavity and the seal cavity;
a balance piston seal disposed radially outward from the balance piston such that the balance piston seal and the balance piston define a radial clearance therebetween, the radial clearance being configured to provide fluid communication from the impeller to the discharge cavity; and
a heat shield disposed in the discharge cavity and configured to prevent the conduction of heat from the discharge cavity to the seal cavity via the casing, wherein the compressor is configured to provide a compression ratio in a range from 8:1 to 14:1,
wherein the heat shield is disposed adjacent an inner surface of the casing such that the heat shield lines the inner surface of the casing.

8. A compressor, comprising:
a casing at least partially defining a discharge cavity and a seal cavity;
a rotary shaft disposed in the casing and configured to be driven by a driver; a shaft seal assembly disposed in the seal cavity and radially outward from the rotary shaft;
an impeller coupled with the rotary shaft, the impeller configured to receive a process fluid and discharge the process fluid at an absolute Mach number in a range from 1 Mach to 1.5 Mach;
a balance piston integral with the impeller and at least partially defining the discharge cavity and the seal cavity;
a balance piston seal disposed radially outward from the balance piston such that the balance piston seal and the balance piston define a radial clearance therebetween, the radial clearance being configured to provide fluid communication from the impeller to the discharge cavity;
a heat shield disposed in the discharge cavity and configured to prevent the conduction of heat from the discharge cavity to the seal cavity via the casing, wherein the compressor is configured to provide a compression ratio in a range from 8:1 to 14:1,
wherein the heat shield is disposed proximal an inner surface of the casing such that the heat shield and the inner surface define a cooling gap therebetween; and a cooling fluid source in fluid communication with a first end portion of the cooling gap and configured to direct a cooling fluid to the cooling gap, wherein the cooling fluid source comprises an internal cooling fluid source or an external cooling source.

9. The compressor of claim 8, wherein a second end portion of the cooling gap is in fluid communication with the discharge cavity and configured to discharge the cooling fluid from the cooling gap to the discharge cavity.

10. The compressor of claim 8, wherein the cooling fluid source is the seal cavity, and the cooling fluid is seal gas discharged from the seal cavity.

11. The compressor of claim 8, wherein the cooling fluid source is a closed-loop cooling system of the compressor.

12. The compressor of claim 8, wherein the cooling fluid source is an open-loop cooling system of the compressor.

13. A compression system, comprising:
   a driver; and
   a compressor coupled with the driver via a drive shaft and configured to compress a process fluid to a compression ratio in a range from 8:1 to 14:1, the compressor comprising:
      a casing including an inner surface contoured to at least partially define a discharge cavity having a respective volumetric shape, the casing further at least partially defining a seal cavity;
      a rotary shaft disposed in the casing and coupled with the driver via the drive shaft, the rotary shaft configured to be rotated by the driver via the drive shaft;
      a shaft seal assembly disposed in the seal cavity and radially outward from the rotary shaft; an impeller coupled with the rotary shaft and configured to discharge the process fluid at an absolute Mach in a range from 1 Mach to 1.5 Mach;
      a balance piston integral with the impeller and at least partially defining the discharge cavity and the seal cavity;
      a balance piston seal disposed radially outward from the balance piston such that the balance piston seal and the balance piston define a radial clearance therebetween, the radial clearance being configured to provide fluid communication from the impeller to the discharge cavity; and
      a heat shield disposed in the discharge cavity and contoured as the respective volumetric shape of the discharge cavity, the heat shield arranged to prevent conduction of heat from the discharge cavity to the seal cavity via the casing,
      wherein the heat shield is disposed proximal the inner surface of the casing such that the heat shield and the inner surface of the casing define a cooling gap between the heat shield and the inner surface of the casing,
      wherein the cooling gap is configured in correspondence with the respective volumetric shape of the discharge cavity,
      wherein the cooling gap is in fluid communication with the seal cavity to receive a seal gas from the seal cavity,
      wherein the received sealing gas functions as a cooling gas.

14. The compression system of claim 13, further comprising an axial inlet coupled or integral with the casing, the axial inlet and the casing at least partially defining a fluid pathway of the compressor.

15. The compression system of claim 14, wherein the fluid pathway comprises:
   an inlet passageway configured to receive the process fluid;
   an impeller cavity fluidly coupled with the inlet passageway and configured to receive the impeller;
   a diffuser fluidly coupled with the impeller cavity; and
   a volute fluidly coupled with the diffuser.

\* \* \* \* \*